United States Patent [19]
Metcalf

[11] 3,729,217
[45] Apr. 24, 1973

[54] CONNECTOR AND METHOD
[75] Inventor: Irving R. Metcalf, St. Charles, Ill.
[73] Assignee: Ideal Industries, Inc., Sycamore, Ill.
[22] Filed: May 10, 1971
[21] Appl. No.: 141,727

[52] U.S. Cl. ................. 285/183, 29/456, 29/470.5, 29/463, 29/437, 285/286, 285/390
[51] Int. Cl. ............................................. F16l 15/00
[58] Field of Search .................... 285/340, 424, 183, 285/39, 286, 175, 212, 386, 333, 355, 342; 29/157 R, 157 A, 437, 470.5, 456, 463; 85/32 LS, 36; 138/171

[56] References Cited

UNITED STATES PATENTS

| | | | |
|---|---|---|---|
| 1,053,609 | 2/1913 | Keller | 285/175 X |
| 3,240,515 | 3/1966 | Schmohl | 285/212 |
| 702,125 | 6/1902 | Buckley | 29/157 A |
| 2,460,110 | 1/1949 | Stinchcomb et al | 285/386 |
| 720,580 | 2/1903 | Greenfield | 85/46 |
| 1,472,518 | 10/1923 | Gillette et al | 138/171 |
| 2,155,080 | 4/1939 | Cornell | 285/179 |
| 1,895,133 | 1/1933 | Quarnstrom | 138/171 |
| 2,210,353 | 8/1940 | Barnes | 29/456 |
| 2,980,988 | 4/1961 | Vile | 29/463 X |
| 3,062,568 | 11/1962 | Andresen et al | 285/355 X |

FOREIGN PATENTS OR APPLICATIONS

| | | | |
|---|---|---|---|
| 100,622 | 1/1899 | Germany | 285/39 |
| 108,176 | 8/1943 | Sweden | 29/456 |

Primary Examiner—Dave W. Arola
Attorney—Howard T. Markey et al.

[57] ABSTRACT

A tubular body section having threads attached at one end and a nut held captive on the other end with a tool engaging portion attached intermediate the threads and nut and a method of making the foregoing including the steps of forming the tubular body section from sheet metal, positioning the tool engaging portion on the tubular body section, providing a thread form on the tubular body section adjacent one end thereof, brazing the parts together, thereafter positioning the nut on the other end of the tubular body section and deforming said other end of said tubular body section to hold the nut captive.

12 Claims, 6 Drawing Figures

Patented April 24, 1973
3,729,217
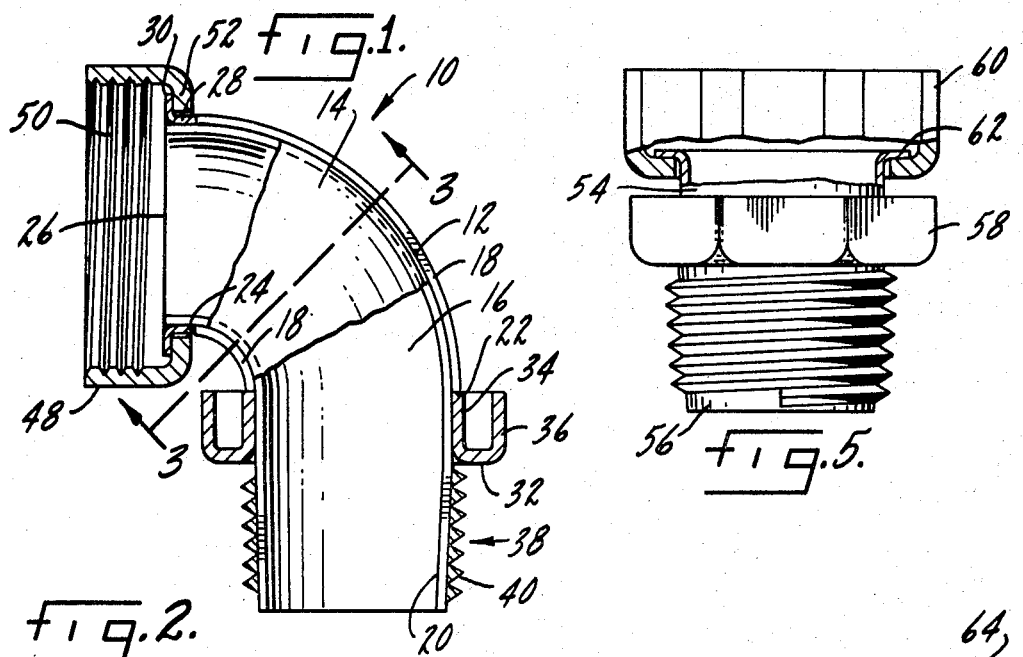
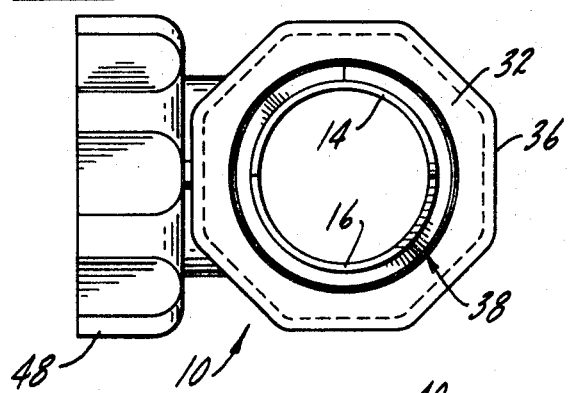
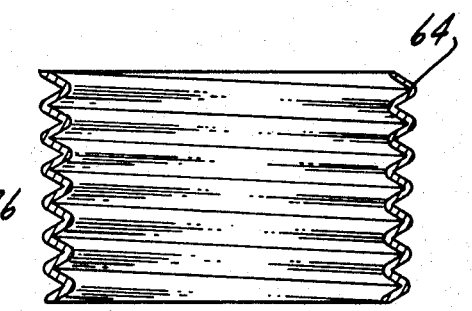
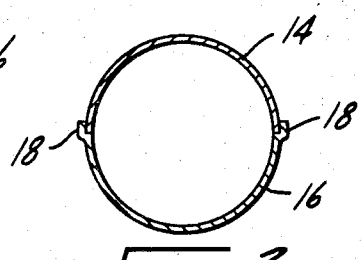
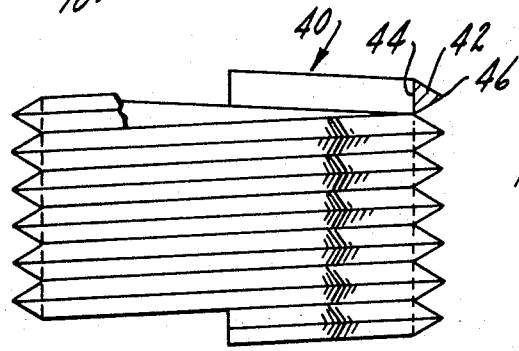
INVENTOR.
Irving R. Metcalf
BY Parker, Carter & Markey
Attorneys.

CONNECTOR AND METHOD

SUMMARY OF THE INVENTION

This invention is concerned with a method and procedure for making a structure for a flexible conduit connector or any threaded fitting and the connecter produced thereby.

A primary object is a connecter for joining flexible conduit that controls and insures the wall thickness under the threads.

Another object is a method of making such connecter which does not produce any chips in forming the threads.

Another object is a connecter assembly which is self-jiggering in the subsequent furnace brazing operation during its manufacture.

Another object is a method of making pipe threads that is inexpensive.

Another object is a flexible conduit connecter and method of making it which does not require any castings.

Another object is a method and connector of the above type which results in a connecter with a clean surface having no residual fluid accumulations which must be removed for plating and corrosion resistance.

Another object is a connector of the above type which can be made in a series of press operations followed by furnace brazing.

Another object is a method of making a connector of the above type which does not require any thread rolling or thread cutting which is quite expensive.

Another object is a method of making threads on a connecter of the above type which guarantees a certain wall thickness under the threads.

Another object is a method of making a tapered pipe thread in a furnace brazing operation which insures a tight joint.

Another object is a method and connecter of the above type which completely eliminates any castings thereby cutting down on scrap and tool loss.

Another object is a fitting and method of the above type which gives a ferrous product without any casting and a minimum of machining.

Another object is a method and connecter of the above type made on spring coiling and stamping equipment.

Other objects will appear from time to time in the ensuing specification and drawing in which:

BRIEF DESCRIPTION OF THE DRAWINGS

FIG. 1 is a side view, partly in section, showing one form of the invention;

FIG. 2 is a bottom view of FIG. 1;

FIG. 3 is a section along line 3—3 of FIG. 1;

FIG. 4 is an enlarged view, partly in section, of the coil;

FIG. 5 is a side view, partly in section, of a variant form; and

FIG. 6 is a section through a variant form of thread formation.

DESCRIPTION OF THE PREFERRED EMBODIMENT

In FIG. 1 a connecter is indicated generally at 10 in the form of an elbow with a body section 12 made of two halves 14 and 16, one of the halves 16 having flanges or offsets 18 which overlap the abutting edges of the other half 14. Otherwise, the two halves are mirror images of each other and can be made from sheet metal suitably formed as stampings on conventional presses, for example progressive die or transfer presses. The ends of each half are tapered somewhat as at 20 and the overlapping flange or edge 18 on the one half terminates as at 22. Thus, the areas of the abutting edges in the tapered portion 20 are directly abutting with no overlap. The flanges or overlap 18 also terminate at the other end as at 24 in spaced relation to the end 26 so that a sleeve or ring 28 may be slipped on and preliminarily positioned against the edge 24 of the overlap or flange. While the ring 28 has been shown as flared out as at 30, it is initially a simple sleeve or ring or cylinder and the flare 30 is caused later.

An octagonal body 32 which is cylindrical on the inside at 34 and octagonal on the outside at 36 may be stamped or formed from the sheet material and then slipped over the taper 20 until it abuts the edge 22 of the flange or overlap 18.

A thread formation 38 is formed on the taper by coiling a wire 40 of suitable length into a generally cylindrical coil and then slipping it over the taper 20. The wire is shown as having a triangular cross section 42 with one flat side 44 being disposed on the inside of the resulting coil so that the inner surface of the coil presents a smooth cylindrical appearance with the outer edge or point 46 of the triangular forming the crest of the resultant threads. Wire that is triangular in cross section is particularly appropriate since the sides or flanks of the threads resulting from the triangle will be at 60°, which is appropriate for pipe threads.

The wire can be coiled to an internal diameter which is slightly smaller than the maximum outside diameter of the taper 20 so that when the cylindrical inner surface of the coil is slipped onto the taper, the coil will be expanded somewhat throughout its length, thereby giving a slight compression or loaded fit. Since the exterior of the taper increases in diameter from the end, the coil will be progressively expanded from the small end up. But the degree of interference should be sufficiently small such that no great effort is necessary to assemble the two.

Assembly is as follows: The two halves 14 and 16 are brought together, the sleeve 28 is slipped on along with the octagon 32 and the coil 40, all three of which hold the two halves together and properly positioned with their edges abutting. In this form, the unit can be furnace brazed which will seal together the abutting edges of the two halves 14 and 16, will seal the sleeve 28 on one end of the resulting elbow, will seal the octagon in place, and will fuse the inner surface 44 of the coil fully and completely to the exterior of the taper 20. After removal and cooling, a nut 48 with internal threads 50 and a flange or shoulder 52 at one end is slipped over the sleeve 28. And the sleeve is flared or belled out as at 30.

A variant form is shown in FIG. 5, which is straight instead of an elbow like in FIG. 1. The parts and procedure may be the same except that the body 54 is made of a straight tubular section and not two halves, as in FIG. 1. The body may be stamped or drawn from a sheet with a taper formed at one end, as at 56, with the coil shown thereon to be formed, positioned and brazed in the same manner as described in connection with FIG. 1. The octagon 58 may also be the same. After furnace brazing, a nut 60 may be slipped on the other end and that end flared or belled as at 62 to hold the nut in place.

In FIG. 6, a variant form has been shown in which a thread formation 64 is formed from a single piece of aluminum or the like suitably pulled or pressed into the thread form shown on a slight taper to match the taper of end 20 or 56. The rolled thread 64 might be used as a substitute for the coiled thread 40 in certain applications and could be applied, brazed and used in the same manner.

The use, operation and function of the invention are as follows:

Connecters for joining flexible conduit to junction boxes and the like in the past have taken the form of castings which have the disadvantage that, first, they are difficult to clean and threads must be machined on them; second, they have a very dull finish; third, they are very expensive; fourth, after machining they require a thorough cleaning so that all metal chips will be removed; fifth, they must be made on expensive equipment, such as screw machines and the like; and, sixth, they do not insure a uniform wall section under the machine threads which results in high loss due to scraps and rejects.

The present connecter has the advantage that all parts can be formed of stampings made on conventional presses. In the form of FIG. 1, the two halves can be made on a simple transfer press as can the octagon and sleeve. The triangular wire can be formed on simple spring coiling equipment. The parts can be all brought together with the sleeve, octagon and wire coil automatically fixturing the two halves in the brazing furnace. In the resultant product, the thickness of the wall under the threads 38 in the taper 20 will be known and insured. Thus, there will be a minimum of scrap. Also the parts will have an extremely bright finish which results in a very goodlooking final product. All of the joints that are brazed are not required to be metal-to-metal at all points since the braze will fill small gaps. This is true under the coil and between the abutting edges of the two halves and under the sleeve 28. While I have said that the triangular wire is wound to a straight cylinder, it might also have a slight taper, and the braze will fill any gap between the tapered exterior surface 20 and the cylindrical side 44 of the triangular cross section.

In prior constructions, a straight tube has been bent for the elbow. But this has the disadvantage that tubing can only be bent to a certain minimum radius. In the present form where two halves are brought together and the entire assembly brazed, the minimum radius can be very small. Thus, an elbow connecter with a quite small radius will result. While I have shown an overlap 18 between the two halves 14 and 16, it should be understood that it may be a straight butt joint, abutted flange, or interpenetrating teeth with any suitable interlocking edge or some combination thereof. The materials need not be all the same thickness, but the thinnest materials should be on the inside so that they will tend to expand faster against the pieces pressed over the outer surfaces in order to prevent looseness while heating.

Of particular importance is the fact that there is no need to fixture a unit before furnace brazing because the outer parts mechanically force the inner parts together and hold them in place. The present invention completely avoids all of the problems of making castings with a uniform wall thickness and the difficulties of machining malleable iron which inevitably results in a high scrap and tool loss rate. I also avoid having to use nonferrous metals. In certain types of application, the two halves of the body section might be mirror images so that only one press die is required. If desired, a suitable O-ring and retainer might be positioned against the octagon 32 around the threads. But this is optional.

Some of the main advantages of forming threads this way is that no chips are produced which means no cleanup. You can form the thread right up to its shoulder which is extremely difficult to do in machine threads and is very expensive. We can quite accurately control the wall thickness underneath the threads which is extremely difficult, if not impossible, when cutting or rolling threads due to the eccentricity of the parts involved.

Another advantage is that the entire fitting is made of a minimum number of parts. For example, the FIG. 1 form has five parts, the two body halves, the coil, the octagon, and the sleeve. The FIG. 5 form only has three parts, the single body form, the coil and the octagon. The nut in each case is considered separate since it is put on later after furnace brazing.

The FIG. 1 form has the advantage that assembly is simple and does not require accurate spacing. The octagon is slipped on the tapered end until it abuts the ends 22 of the overlap 18. The coil 40 is slipped on the taper until it hits the octagon. The sleeve 28 at the other end is slipped on the end of the two halves until it hits the shoulder 24 of the overlap. These three parts hold the two halves together so that when the unit is put in the furnace, it is self-fixturing. In a tapered pipe thread, the use of a wire coil in the shape shown has the advantage that the ends of the wire are cut square as shown in FIG. 4.

Whereas the thread formation is shown as male threads in the drawings, it should be understood that the coil could be reversed so that the flat side 44 of the triangular cross section would be on the outside instead of the inside and the coil slipped into an internal housing so as to form female threads. One of the advantages of coiling the spring of FIG. 4 into the cylindrical coil rather than a taper is that the unassembled coils will thereafter not have a tendency to nest and in assembly you won't have to discriminate between ends.

The end result is a ferrous product that does not require any casting and a minimum amount of machining the parts can be made by progressive die stamping, transfer press stamping and spring coiling which insures an inexpensive but reliable finished product.

While the preferred form and several variations of the invention have been shown and suggested, it should be understood that suitable additional modifications, changes, substitutions and alterations may be made without departing from the invention's fundamental theme.

I claim:

1. A method of making an electrical connecter for use with flexible conduit or the like, including the steps of forming a tubular body section from sheet metal by pressing two portions of flat sheet into oppositely arranged halves, bringing the two halves together with their edges in abutting contact to form the tubular body section, coiling a predetermined length of wire into a generally cylindrical coil with the cross section of the wire being generally triangular so that one side of the triangle will be on the inside of the resulting coil to form a generally smooth cylindrical inner surface on the coil to contact the exterior of the body section, sliding the coil on the body section, providing a sufficient interference fit between the inside diameter of the coil and the outside diameter of the body section such that the coil will be expanded slightly on the body section to exert a certain degree of compression between the two halves of the body section, and brazing the two halves of the body section together along their abutting edges and, at the same time, brazing the coil on the body section with the two halves and coil being self-jiggered due to the interference fit.

2. The method of claim 1 further characterized by and including the step of tapering the portion of the exterior of the body section that the coil is to be mounted on to a minimum diameter at least no less than the inside diameter of the coil, and allowing all turns of the coil to expand as it is mounted so that the inside of the triangular cross section of the wire will be in compression contact with the outside of the body section.

3. The method of claim 1 characterized in that the connecter is an elbow and further including the step of forming their edges in a lap joint over a substantial portion of their length.

4. In a connecter for joining flexible conduit to a work object, a body section made of sheet metal formed into a generally tubular configuration, the body section being made of two sheet metal halves, a thread formation thereon including a wire coiled into a thread form brazed to the body section, the wire being triangular in cross section with the one side of the triangle being disposed on the inside of the coil so as to provide a smooth inner surface in engagement with the exterior surface on the body section, the wire coil, in its free state, having an inside diameter slightly less than the outside diameter of the body section such that when the coil is mounted thereon, it will be slightly expanded providing an interference fit.

5. The structure of claim 4 further characterized in that the wire coil is mounted on a tapered portion on the body section with the smallest diameter of the taper being slightly greater than the inside diameter of the coil.

6. A body member for use in joining a connector for flexible conduit to a terminus, including a tubular sheet metal sleeve with a thread formed on the exterior of one end for connection to a terminus, a polygon connected on the outside of the sleeve adjacent the thread form with a cylindrical interior therethrough, a nut on the other end of the sleeve for joining a flexible conduit connector, and overlapping flanges between the other end of the sleeve and the nut so that the nut will freely rotate on the body member, the flange on the sheet metal sleeve being in fixed spatial relationship to the polygon and thread form.

7. The structure of claim 6 further characterized in that the polygon is made out of sheet metal and its cylindrical interior is braized to the sleeve.

8. The structure of claim 6 further characterized in that the axis of the sleeve is straight.

9. The structure of claim 6 further characterized in that the axis of the sleeve turns through 90°.

10. A method of making a body member for joining a connector for flexible conduit to a terminus, including the steps of forming a tubular body section from sheet metal, positioning a sheet metal polygon annulus with a cylindrical interior therethrough on the outside of the body section between the ends thereof, providing a thread form on the exterior of the body section adjacent one end thereof, braizing the various parts together, thereafter positioning an internally-threaded nut on the other end of the body section, and deforming the said other end of the body section to retain the nut thereon.

11. The method of claim 10 further characterized in that the step of forming a tubular body section includes stamping a straight tubular piece from a flat sheet.

12. The method of claim 10 further characterized in that the step of forming a tubular body section includes positioning a sleeve on the said other end thereof, and the step of deforming the said other end of the body section includes deforming the sleeve so that it radially overlaps and retains the nut.

* * * * *